United States Patent
Balmakhtar et al.

(10) Patent No.: US 11,051,218 B2
(45) Date of Patent: Jun. 29, 2021

(54) MANAGEMENT OF AN INTERNET PROTOCOL MULTIMEDIA SUBSYSTEM (IMS) MEDIA SESSION FOR USER EQUIPMENT (UE)

(71) Applicant: T-Mobile Innovations LLC, Overland Park, KS (US)

(72) Inventors: Marouane Balmakhtar, Dumfries, VA (US); Aaron Paul Hinkle, Centreville, VA (US); G. Murat Karabulut, Vienna, VA (US)

(73) Assignee: SPRINT COMMUNICATIONS COMPANY LLC, Overland Park, KS (US)

( * ) Notice: Subject to any disclaimer, the term of this patent is extended or adjusted under 35 U.S.C. 154(b) by 0 days.

(21) Appl. No.: 16/351,795

(22) Filed: Mar. 13, 2019

(65) Prior Publication Data

US 2019/0215741 A1    Jul. 11, 2019

Related U.S. Application Data

(63) Continuation of application No. 15/071,539, filed on Mar. 16, 2016, now Pat. No. 10,278,100.

(51) Int. Cl.
*H04W 36/00* (2009.01)
*H04M 15/00* (2006.01)
(Continued)

(52) U.S. Cl.
CPC ......... *H04W 36/0077* (2013.01); *H04L 12/14* (2013.01); *H04L 12/1407* (2013.01);
(Continued)

(58) Field of Classification Search
CPC ............ H04W 36/0077; H04W 76/10; H04W 28/0268; H04W 80/04; H04M 15/66; H04B 7/0413
See application file for complete search history.

(56) References Cited

U.S. PATENT DOCUMENTS

| | | | |
|---|---|---|---|
| 8,018,955 | B2 | 9/2011 | Agarwal et al. |
| 8,483,182 | B1 | 7/2013 | Keller et al. |

(Continued)

FOREIGN PATENT DOCUMENTS

| | | |
|---|---|---|
| WO | 2008057359 A1 | 5/2008 |
| WO | 2009021549 A1 | 2/2009 |
| WO | 2010078728 A1 | 7/2010 |

*Primary Examiner* — Mounir Moutaouakil

(57) ABSTRACT

A data communication system delivers voice-conferencing and video-conferencing to User Equipment (UE). A wireless communication network establishes a signaling bearer between the UE and an Internet Protocol Multimedia Subsystem (IMS). The IMS initiates a video-conference bearer for the UE over the wireless communication network. The wireless communication network exchanges video data over the video-conference bearer using Carrier Aggregation (CA). In response to a UE handover to a target wireless access node, the wireless communication network signals the IMS to convert the video-conference bearer into a voice-conference bearer based on Carrier Aggregation (CA) technology at the target wireless access node. The IMS initiates a voice-conference bearer for the UE over the wireless communication network. The wireless communication network exchanges voice data over the voice-conference bearer. After another handover, the wireless communication network and the IMS may convert the voice-conference bearer back into a video-conference bearer.

20 Claims, 7 Drawing Sheets

(51) Int. Cl.
*H04W 76/10* (2018.01)
*H04L 29/06* (2006.01)
*H04L 12/14* (2006.01)
*H04W 28/02* (2009.01)
*H04B 7/0413* (2017.01)
*H04W 80/04* (2009.01)

(52) U.S. Cl.
CPC ........ *H04L 65/104* (2013.01); *H04L 65/1016* (2013.01); *H04L 65/80* (2013.01); *H04M 15/00* (2013.01); *H04M 15/57* (2013.01); *H04M 15/61* (2013.01); *H04M 15/66* (2013.01); *H04M 15/8214* (2013.01); *H04M 15/8228* (2013.01); *H04W 28/0268* (2013.01); *H04W 36/0072* (2013.01); *H04W 76/10* (2018.02); *H04B 7/0413* (2013.01); *H04W 80/04* (2013.01)

(56) References Cited

U.S. PATENT DOCUMENTS

| | | | |
|---|---|---|---|
| 9,288,792 B2 | 3/2016 | Hori et al. | |
| 9,608,715 B1 | 3/2017 | Fang | |
| 9,693,381 B2 | 6/2017 | Jamadagni et al. | |
| 9,787,726 B2 | 10/2017 | Russell et al. | |
| 9,924,431 B2 | 3/2018 | Claassen et al. | |
| 9,942,803 B2 | 4/2018 | Ng et al. | |
| 10,348,520 B2 * | 7/2019 | Ding | H04L 65/608 |
| 2004/0255331 A1 * | 12/2004 | Inoue | H04L 1/1607 |
| | | | 725/118 |
| 2004/0264563 A1 * | 12/2004 | Inoue | H04N 7/14 |
| | | | 375/240.01 |
| 2008/0267128 A1 | 10/2008 | Bennett et al. | |
| 2009/0168726 A1 | 7/2009 | Thalanany et al. | |
| 2010/0214977 A1 | 8/2010 | Hegde | |
| 2012/0106508 A1 | 5/2012 | Zhou et al. | |
| 2012/0230217 A1 * | 9/2012 | Sawai | H04L 5/001 |
| | | | 370/252 |
| 2014/0185467 A1 * | 7/2014 | Heo | H04W 52/54 |
| | | | 370/252 |
| 2015/0208323 A1 * | 7/2015 | Joung | H04W 48/06 |
| | | | 455/435.1 |
| 2015/0282013 A1 | 10/2015 | Kim et al. | |
| 2015/0358477 A1 | 12/2015 | Jeong et al. | |
| 2016/0021579 A1 * | 1/2016 | Mufti | H04W 36/08 |
| | | | 370/331 |
| 2016/0088496 A1 * | 3/2016 | Takano | H04W 24/02 |
| | | | 455/450 |
| 2016/0112896 A1 * | 4/2016 | Karampatsis | H04W 28/0252 |
| | | | 370/230.1 |
| 2016/0135093 A1 | 5/2016 | Wong et al. | |
| 2016/0142447 A1 * | 5/2016 | Mufti | H04L 65/1046 |
| | | | 370/260 |
| 2016/0150574 A1 | 5/2016 | Edge et al. | |
| 2016/0226922 A1 | 8/2016 | Russell et al. | |
| 2016/0337898 A1 | 11/2016 | Jeong et al. | |
| 2017/0055197 A1 | 2/2017 | Shukair et al. | |
| 2017/0142624 A1 | 5/2017 | Brown et al. | |
| 2017/0188270 A1 | 6/2017 | Shan et al. | |
| 2017/0223515 A1 | 8/2017 | Mutikainen et al. | |
| 2017/0265119 A1 | 9/2017 | Fang | |
| 2017/0289859 A1 | 10/2017 | Stenfelt et al. | |
| 2017/0331671 A1 | 11/2017 | Olsson | |
| 2017/0367012 A1 | 12/2017 | Muller et al. | |
| 2017/0374604 A1 | 12/2017 | Stenfelt et al. | |
| 2018/0027610 A1 | 1/2018 | Werner et al. | |
| 2018/0041924 A1 | 2/2018 | Hori et al. | |
| 2018/0124355 A1 * | 5/2018 | Perraud | H04W 36/023 |
| 2018/0255594 A1 | 9/2018 | Liang et al. | |
| 2019/0297538 A1 * | 9/2019 | Keller | H04W 36/0022 |

* cited by examiner

MANAGEMENT OF AN INTERNET PROTOCOL MULTIMEDIA SUBSYSTEM (IMS) MEDIA SESSION FOR USER EQUIPMENT (UE)

RELATED CASES

This United States patent application is a continuation of U.S. patent application Ser. No. 15/071,539 that was filed on Mar. 16, 2016 and is entitled "A LONG TERM EVOLUTION (LTE) MOBILITY MANAGEMENT ENTITY (MME) MANAGEMENT OF AN INTERNET PROTOCOL MULTIMEDIA SUBSYSTEM (IMS) MEDIA SESSION SERVICE LEVEL FOR A USER EQUIPMENT (UE)." U.S. patent application Ser. No. 15/071,539 is hereby incorporated by reference into this United States patent application.

TECHNICAL BACKGROUND

Wireless communication systems provide User Equipment (UE), such as smartphones, tablet computers, and other media devices, wireless access to communication services and allow users to move about and communicate over the air with access communication networks. Data communication networks, such as Long Term Evolution (LTE), exchange data packets with UEs to provide services, such as internet access, media streaming, voice calls, and text messaging.

Using LTE, a UE detects, attaches to, and registers with an LTE base station, wherein the LTE base station serves as the access point into an LTE wireless network to provide access to LTE network elements, such as a Serving Gateway (S-GW), Mobility Management Entity (MME), Packet Data Network Gateway (P-GW), Policy and Charging Rules Function (PCRF), and other LTE network elements. The UE can register with the LTE base station when the UE is powered-on or when the UE moves into a coverage area of the LTE base station. LTE base stations may include evolved NodeBs (eNodeBs), mini-macrocells, picocells, femtocells, and various other LTE base station capable of providing a UE access to the LTE wireless network.

The UE also typically registers with an Internet Protocol Multimedia Subsystem (IMS) to facilitate the exchange of Internet Protocol (IP) packets between UEs for media sessions and other data transfer services. The UE registers an IP address with the IMS systems over the IP access networks and use the registered IP address to exchange messaging for the IP communication sessions. A UE may register with an IMS system directly using various access systems, including LTE, Code Division Multiple Access (CDMA), Global System for Mobile Communications (GSM), Ethernet, and other access systems.

Enhanced communication services may be available for some LTE base stations. These enhanced services may include Carrier Aggregations, beamforming, Multiple Input Multiple Output (MIMO), and backhaul services. These enhanced services can often extend or enhance a service level available for an IMS media session for a UE, such as Voice over LTE (VoLTE) calls or Video over LTE (ViLTE) calls. Unfortunately, there is no efficient and effective way to modify service levels for an IMS media session when a UE is handed-over between LTE base stations having different enhanced service capabilities.

Technical Overview

A data communication system delivers voice-conferencing and video-conferencing to User Equipment (UE). A wireless communication network establishes a signaling bearer between the UE and an Internet Protocol Multimedia Subsystem (IMS). The IMS initiates a video-conference bearer for the UE over the wireless communication network. The wireless communication network exchanges video data over the video-conference bearer using Carrier Aggregation (CA). In response to a UE handover to a target wireless access node, the wireless communication network signals the IMS to convert the video-conference bearer into a voice-conference bearer based on Carrier Aggregation (CA) technology at the target wireless access node. The IMS initiates a voice-conference bearer for the UE over the wireless communication network. The wireless communication network exchanges voice data over the voice-conference bearer. After another handover, the wireless communication network and the IMS may convert the voice-conference bearer back into a video-conference bearer.

DETAILED DESCRIPTION

Figure 1:
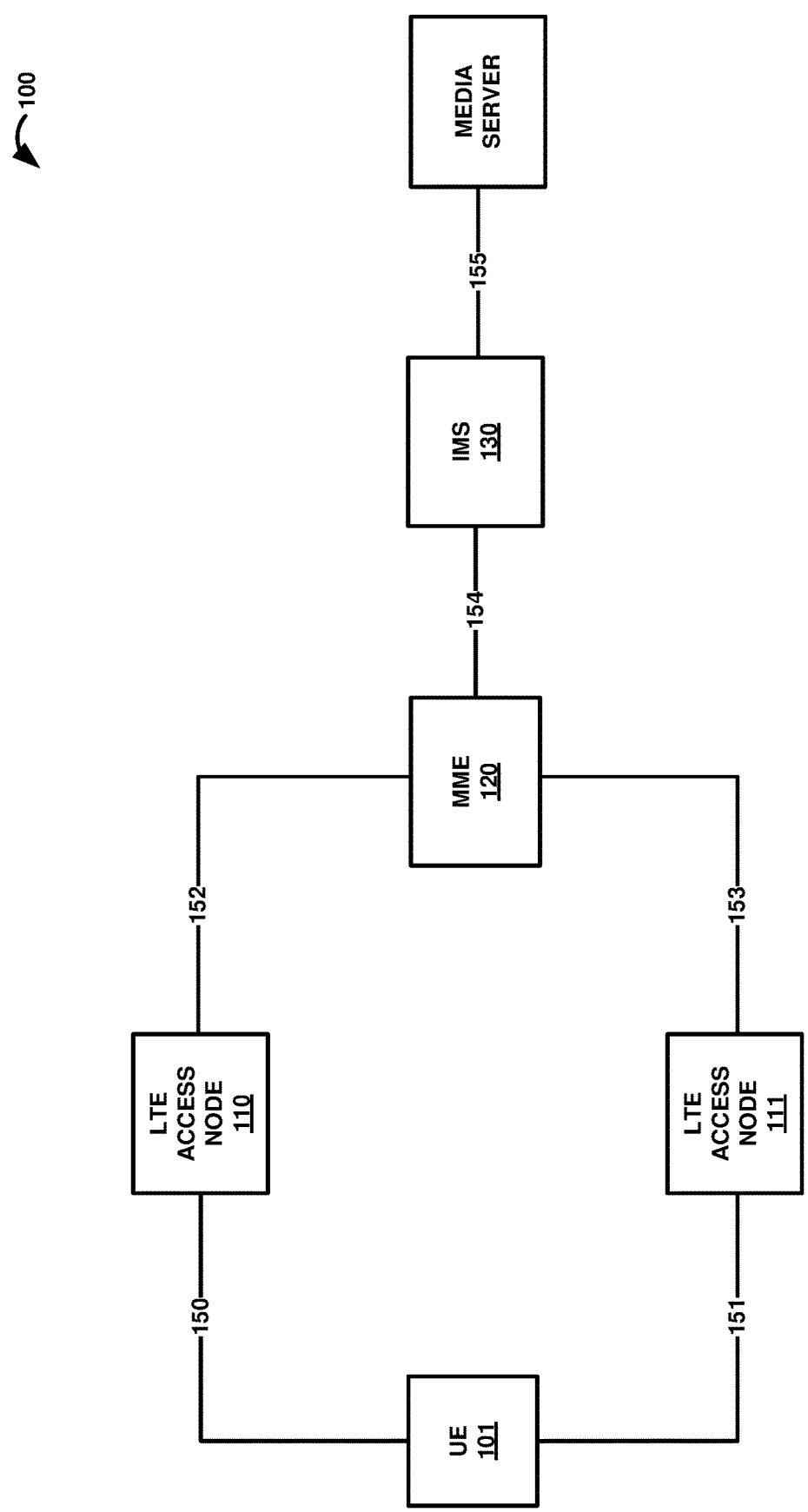
FIGS. 1-3 illustrate a Long Term Evolution (LTE) communication network to manage a service level for an Internet Protocol Multimedia Subsystem (IMS) media session for a User Equipment (UE).
Figure 2:
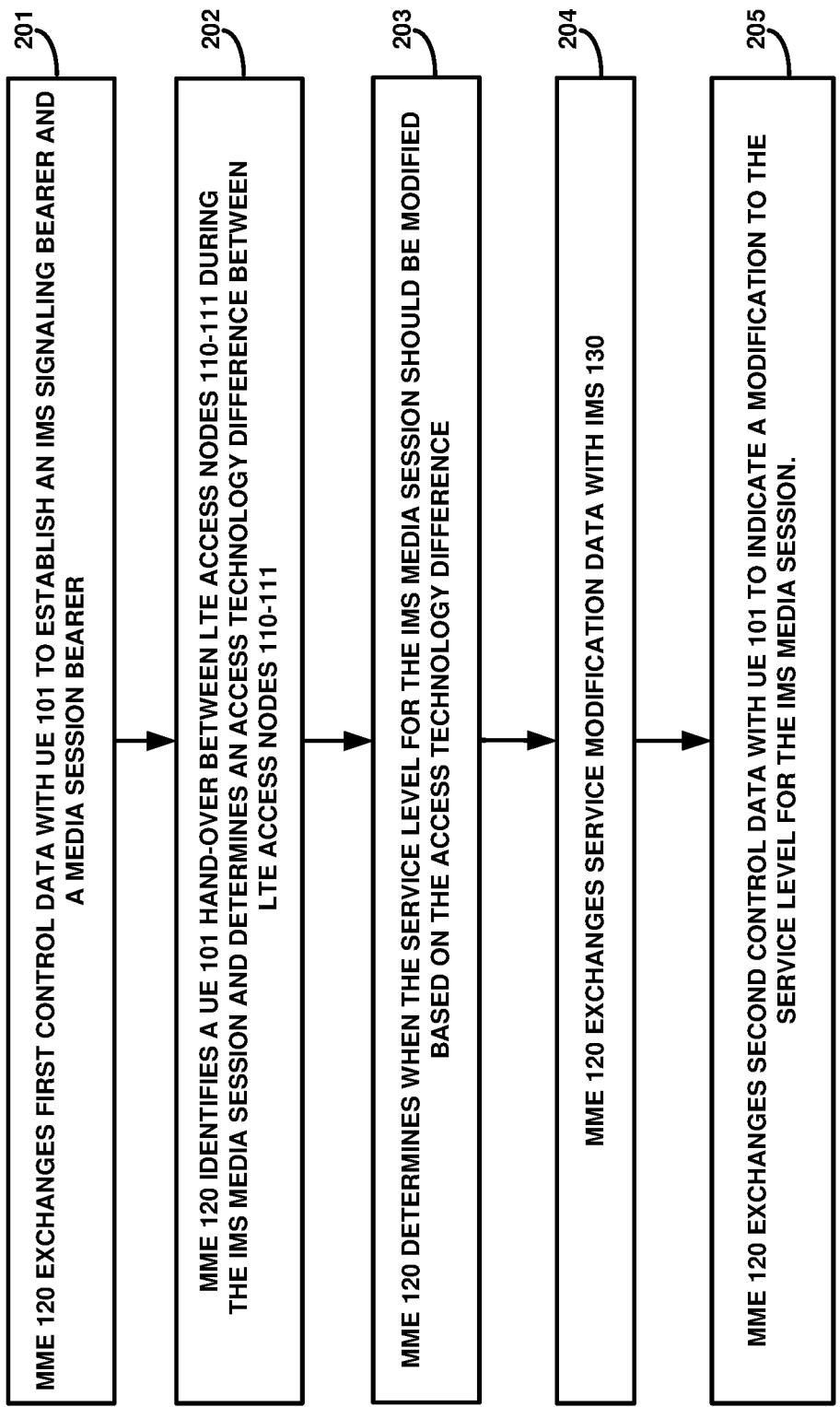
Figure 3:
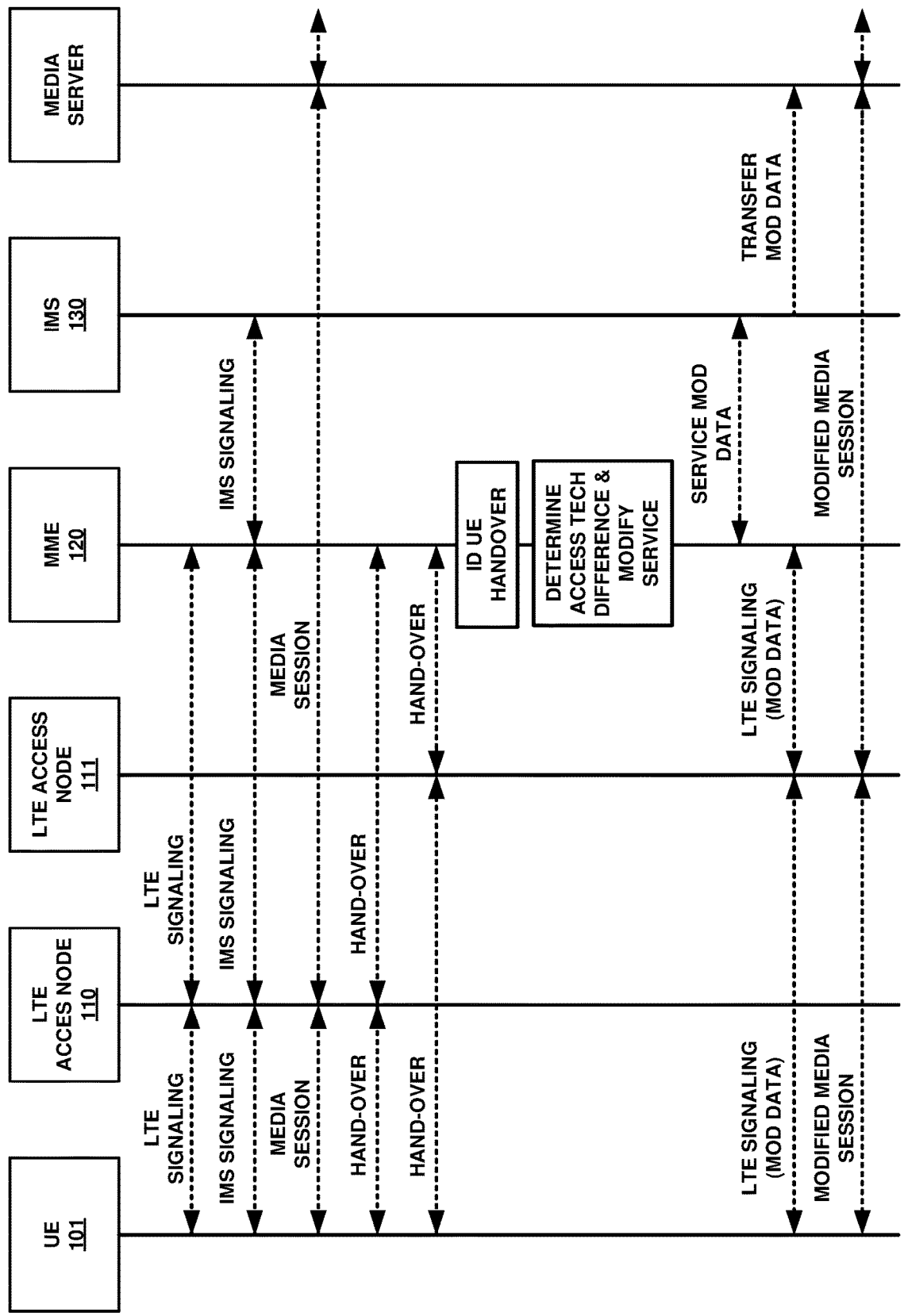

FIGS. 1-3 illustrate LTE communication system 100 to manage a service level for an Internet Protocol Multimedia Subsystem (IMS) media session for a User Equipment (UE). LTE communication system 100 includes UE 101, LTE access nodes 110-111, Mobility Management Entity (MME) 120, IMS 130, and a Media Application Server. UE 101 and LTE access node 110 communicate over wireless link 150. UE 101 and LTE access node 111 communicate over wireless link 151. LTE access node 110 and MME 120 communicate over communication link 152. LTE access node 111 and MME 120 communicate over communication link 153. MME 120 and IMS 130 communicate over communication link 154. IMS 130 and the Media Application Server communication over communication link 155.

In operation, MME 120 manages a service level for an IMS media session for UE 101. The IMS media session may be a conversational voice call, a conversational video call, media streaming, internet access, or some other IMS media service. In some examples, the IMS media session comprises a Voice over LTE (VoLTE) media session. In other examples, IMS media session comprises a Video over LTE (ViLTE) media session. The service level may be associated with the type of IMS media session, such as a conversational voice call. The service level may also be associated with a level of quality for the IMS media session, such as a High Definition (HD) conversational voice call.

MME 120 exchanges first control data with UE 101 to establish an IMS signaling bearer and a media session bearer. The first control data may be a codec, bit rate, Quality of Service (QoS) level requirements, or some other service level indicator. The first control data may be used as part of the IMS registration process to set up default bearers for UE 101, such as a QoS Class Identifier (QCI) 5 to exchange SIP signaling messages. UE 101 may be capable of establishing multiple bearers.

The first control data may characterize service level for the IMS media session over LTE access node 110. The first control data may also include a Radio Access Technology (RAT) type, a Packet Data Network (P-GW) identifier (ID), a Policy Charging Rules Function (PCRF) ID, a UE ID, or some other data that characterizes the IMS media session over LTE access node 110.

MME 120 identifies a UE 101 hand-over between LTE access nodes 110-111 during the IMS media session and determines an access technology capabilities difference between LTE access nodes 110-111. MME 120 may determine the access technology capabilities of LTE access node 110 and LTE access node 111 by transferring a request message to LTE access nodes 110-111 and receiving a response message from LTE access nodes 110-111 indicating the access technology capabilities. MME 120 may also determine access technology capabilities of LTE access nodes 110-111 based on data stored in MME 120 or by querying a Home Subscriber System (HSS).

The access technology capabilities difference may be based on LTE access node 111 capabilities to utilize beamforming services, Multiple Input Multiple Output (MIMO) services, Carrier Aggregation services, backhaul services, or some other service that may be available on LTE access node 110 and not on LTE access node 111, or vice versa. The access technology capabilities difference between LTE access node 110 and LTE access node 111 may be due to LTE access node 110 and LTE access node 111 being a different type of LTE access node, such as an eNodeB, a picocell, a mini-macro cell, or some other LTE access node capable of exchanging data between UE 101 and MME 120.

MME 120 determines when the service level for the IMS media session should be modified based on the access technology difference and exchanges service modification data with IMS 130. MME 120 may determine that the service level for the IMS media session should be modified based on an upgraded service or downgraded service level. In some examples, MME 120 determines when the service level for the IMS media session should be modified based on the access technology difference by MME 120 exchanging session modification data with a PCRF.

In other examples, MME 120 may determine that the service level for the IMS media session should be modified and notify a Telephony Application Service (TAS) in IMS 130 to modify the data. In other examples, MME 120 may transfer a notification message to IMS 130 indicating the technology difference between LTE access node 110 and LTE access node 111 and the TAS in IMS 130 may determine whether the service level for the IMS media session should be modified based on the access technology difference. In some examples, IMS 130 may notify the Media Application Server of the IMS media session modification for UE 101.

MME 120 exchanges second control data with UE 101 to indicate a modification to the service level for the IMS media session. The second control data may be a codec, bit rate, QoS level requirement, or some other service level indicator. The second control data may characterize service level for the IMS media session over LTE access node 111. MME 120 may exchange second control data with UE 101 by transferring a request to modify the service level for the IMS media session in a Non Access Stratum (NAS) message. In some examples, MME 120 exchanges the service modification data with IMS 130 by exchanging Diameter Application Protocol messaging. In other examples, UE 101 may receive the second control data in a SIP message transferred by IMS 130 indicating the request to modify the service level for the IMS media session.

FIG. 2 illustrates a flow diagram of LTE communication system 100 to manage a service level for an IMS media session for a UE. MME 120 exchanges (201) first control data with UE 101 to establish an IMS signaling bearer and a media session bearer. MME 120 identifies (202) a UE 101 hand-over between LTE access nodes 110-111 during the IMS media session and determines (202) an access technology capabilities difference between LTE access nodes 110-111. MME 120 determines (203) when the service level for the IMS media session should be modified based on the access technology difference. MME 120 exchanges (204) service modification data with IMS 130. MME 120 exchanges (205) second control data with UE 101 to indicate a modification to the service level for the IMS media session.

FIG. 3 illustrates LTE communication system 100 to manage a service level for an IMS media session for a UE. MME 120 exchanges first control data with UE 101 over LTE access node 110. UE 101 also exchanges LTE signaling with MME 120 and IMS signaling with IMS 130 to establish an IMS media session. For example, UE 101 may register with MME 120 and IMS 130 over LTE access node 110, and establish an IMS signaling bearer, such as a QCI 5. UE 101 may then initiate an HD conversational video call with a destination UE and establish a media session bearer for the HD conversational video call, such as a QCI 2. In this example, MME 120 and UE 101 may exchange additional data over LTE access node 110 such as a RAT type, codecs, bits rates, and other control data to establish the conversational voice call for UE 101.

MME 120 then identifies a UE hand-over between LTE access nodes 110-111 during the IMS media session and determines an access technology capabilities difference between LTE access nodes 110-111. For example, LTE access node 110 may determine that UE 101 is moving out of a service area served by LTE access node 110 and transfer an instruction to UE 101 to attach to LTE access node 111. UE 101 may then attach to LTE access node 111 which would transfer a notification message to MME 120 indicating that UE 101 has been handed-over from LTE access node 110 to LTE access node 111. In this example, MME 120 may determine that LTE access node 110 had beamforming capabilities and LTE access node 111 does not have beamforming capabilities based on data stored in MME 120. Beamforming uses multiple transmitting antennas to provide increased power for particular communications which may result in higher throughput signaling. Therefore, LTE access node 111 may not be capable of maintaining the service level required for the HD conversational video call for UE 101.

MME 120 determines when the service level for the IMS media session should be modified based on the access technology difference and exchanges service modification data with IMS 130. For example, if MME 120 determines that LTE access node 111 does not have beamforming capabilities and cannot maintain the service level required for the HD conversational video call for UE 101, MME 120 may determine that the service level should be modified to maintain a standard, non-HD conversational video call for UE 101. In this example, MME 120 may exchange downgrade modification data with IMS 130 using Diameter Application Protocol messaging.

MME 120 then exchanges second control data with UE 101 to indicate a modification to the service level for the IMS media session. For example, MME 120 may transfer second control data in a NAS message to UE 101 indicating a second codec data set and bitrates to be used for the standard, non-HD conversational video call. In this example, IMS 130 may also notify the Media Application Server of the service level modification by transferring modification data to the Media Application Server.

Figure 4:
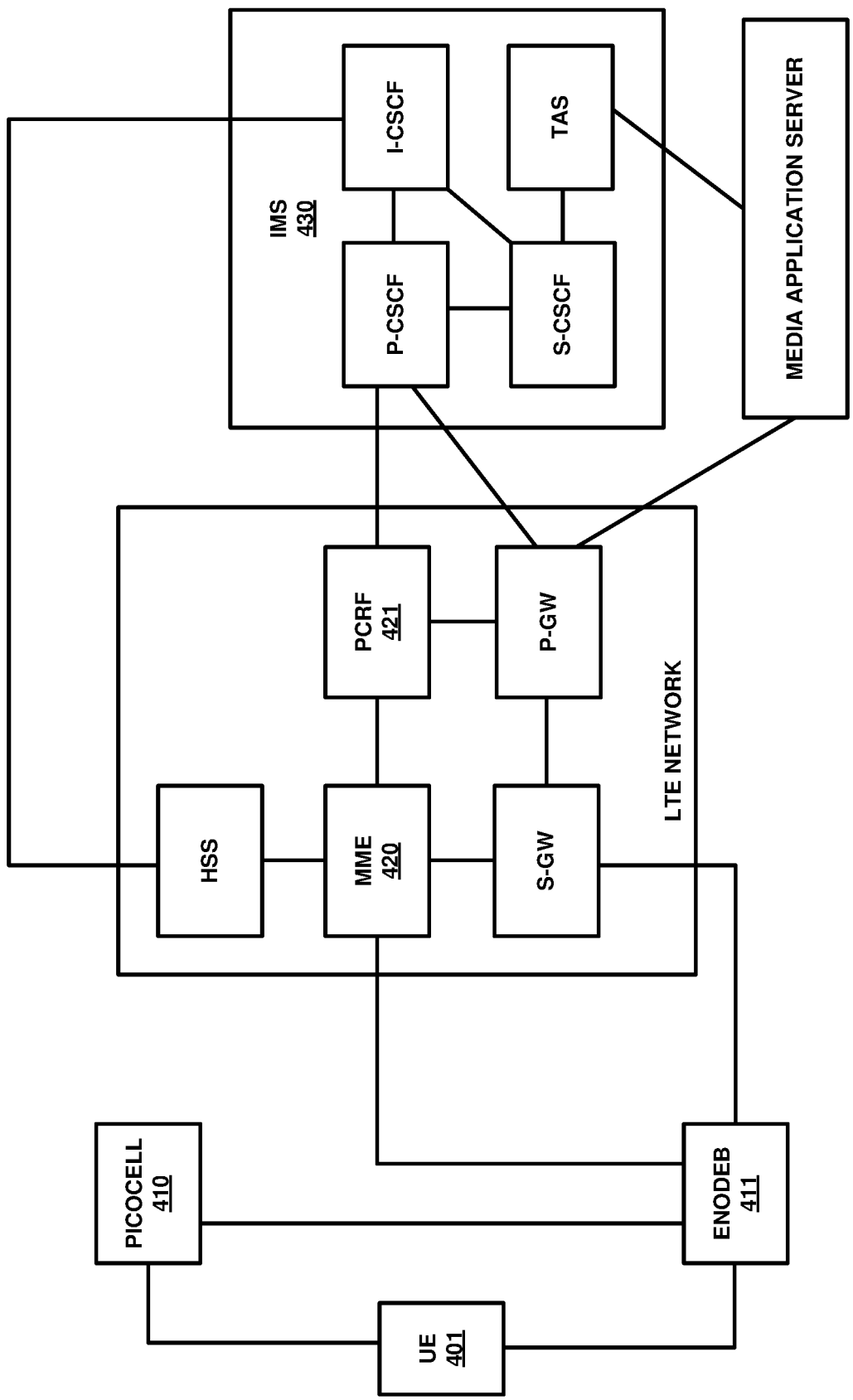
FIGS. 4-6 illustrate an LTE communication network to manage a service level for an IMS media session for a UE.
Figure 5:
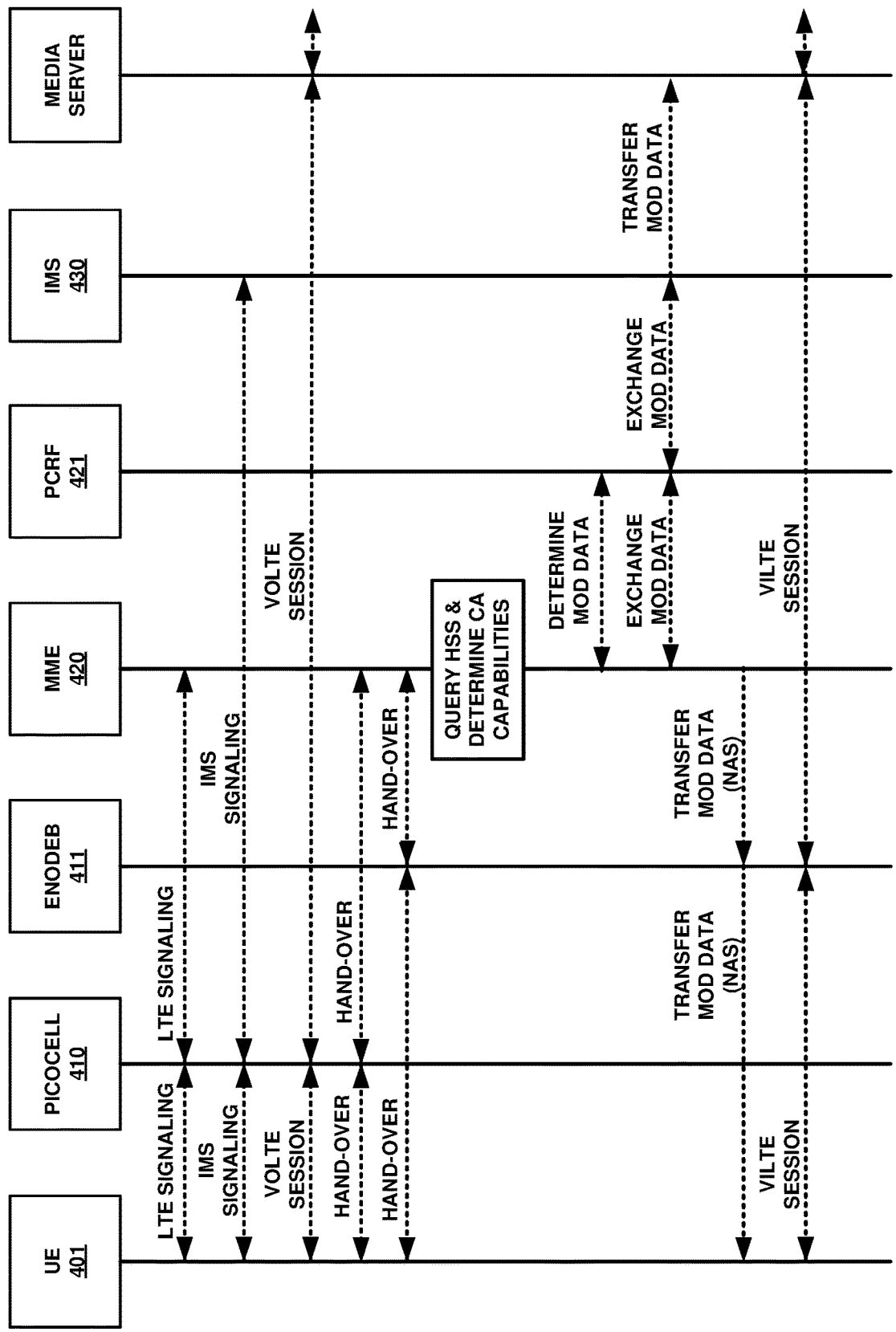
Figure 6:
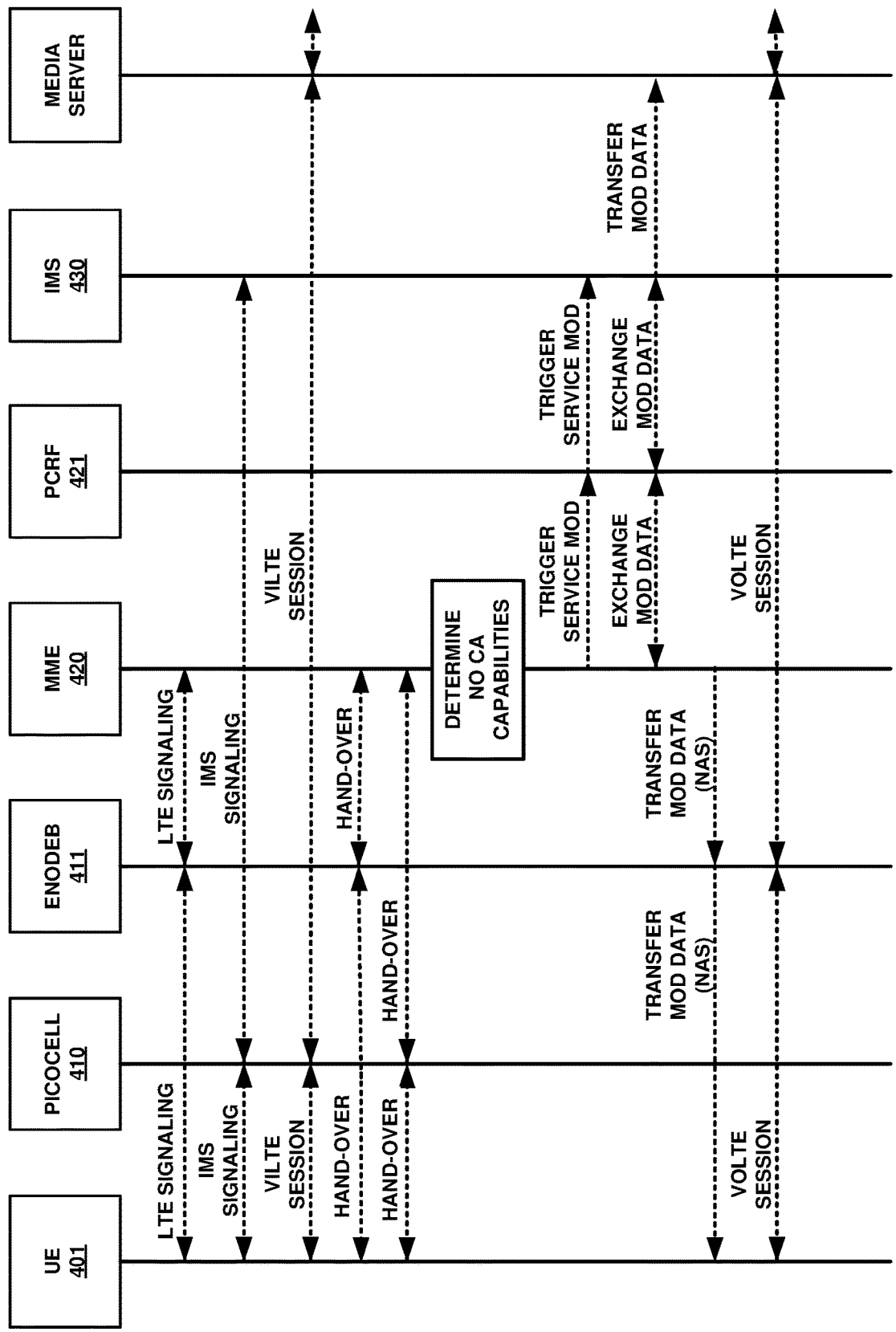

FIGS. 4-6 illustrate LTE communication system 400 to manage a service level for an IMS media session for a UE. LTE communication system 400 is an example of LTE communication system 100, although LTE communication system 100 may use alternative configurations and operations. Referring to FIG. 4, LTE communication system 400 includes UE 401, picocell 410, eNodeB 411, an LTE network, IMS 430, and a Media Application Server. The LTE network includes MME 420, an HSS, a Serving Gateway (S-GW), a P-GW, and PCRF 421. The IMS system includes a Proxy Call Session Control Function (P-CSCF), a Interrogating Call Session Control Function (I-CSCF), Serving Call Session Control Function (S-CSCF), and TAS 430.

FIG. 5 illustrates an operation of LTE communication system 400 to manage a service level for an IMS media session for UE 401. In operation, MME 420 exchanges LTE signaling having first codec data with UE 401 over picocell 410. UE 401 also exchanges IMS signaling with IMS 430 over picocell 410 and establishes IMS bearers, such as a QCI 5. In this example, UE 401 initiates a ViLTE call but since picocell 410 does not have Carrier Aggregation, picocell 410 is unable to provide the level of service required to establish the ViLTE call. Therefore, a VoLTE call is established instead. In a next operation, UE 401 is handed-over from picocell 410 to eNodeB 411 and eNodeB 411 notifies MME 420 of the hand-over.

In response to identifying that UE 401 has been handed over from picocell 410 to eNodeB 411, MME 420 queries the HSS and determines that eNodeB 411 has Carrier Aggregation capabilities. MME 420 then determines that eNodeB 411 is capable of providing the service level required for the initiated ViLTE call and exchanges session modification data with PCRF 421 to determine if the service level should be modified. In response to determining that the service level should be modified, MME 420 then exchanges modification data with IMS 430 over PCRF 421. IMS 430 also notifies the Application Media Server to of the modified service level. MME 420 then exchanges second modified codec data with UE 401 over eNodeB 411 using NAS messaging. In a final operation, an IMS ViLTE media session is established between UE 401 and the destination UE over eNodeB 411.

FIG. 6 illustrates another operation of LTE communication system 400 to manage a service level for an IMS media session for a UE. In operation, MME 420 exchanges LTE signaling and first bit rate data with UE 401 over eNodeB 411. MME 420 also exchanges SIP signaling with IMS 430 and establishes an IMS bearer using PCRF 421, such as a QCI 5. In this example, UE 401 again initiates a ViLTE call with a destination UE over the LTE network and IMs 430. In response to UE 401 initiating the ViLTE call, IMS 430 establishes a ViLTE media session over eNodeB 411 since eNodeB is capable of establishing the ViLTE media session. In a next operation, UE 401 is handed-over from eNodeB 411 to picocell 410.

In response to identifying that UE 401 has been handed over from eNodeB 411 to picocell 410, MME 420 determines that picocell 410 does not have Carrier Aggregation capabilities and that picocell 410 is not capable of providing the service level required for the initiated ViLTE call. MME 420 then notifies PCRF 421 of the difference in access technology between eNodeB 411 and picocell 410 using a trigger and PCRF 421 notifies IMS 430 to determine if the media session service level should be modified. In this example, it is determined that the service level should be modified. In response to determining that the service level should be modified, MME 420 then exchanges modification data with IMS 430 over a Diameter Application Protocol messaging. MME 420 then exchanges second modified codec data with UE 401 over eNodeB 411 using NAS messaging and IMS 430 transfers a notification to the Media Application Server indicating that the media session service level has been modified for UE 401. In a final operation, a VoLTE media session is established between UE 401 and the destination UE over eNodeB 411.

Figure 7:
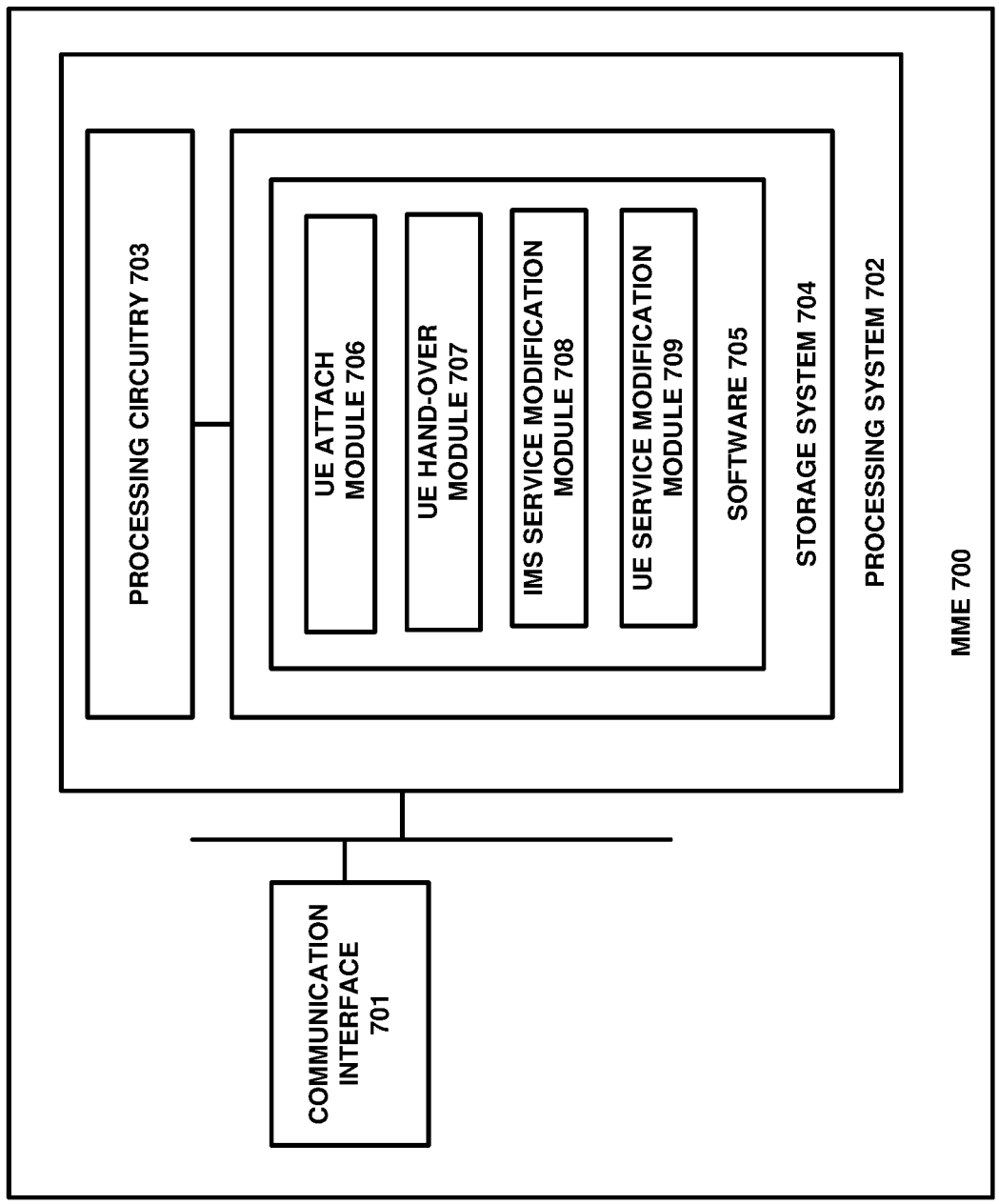
FIG. 7 illustrates an LTE MME to manage a service level for an IMS media session for a UE.

FIG. 7 illustrates MME 700 to manage a service level for an IMS media session for a UE. MME 700 is an example of MME 120 and MME 420, although MME 120 and MME 420 may use alternative configurations and operations. MME 700 includes communication interface 701 and data processing system 702. Data processing system 702 is linked to communication interface 701.

Communication interface 701 comprises communication components, such as antennas, ports, amplifiers, filters, modulators, signal processors, and the like. Communication interface 701 exchanges first control data and second control data with a UE. Communication interface 701 also exchanges modification data with an IMS.

Data processing system 702 includes processing circuitry 703 and storage system 704 that stores software 705. Processing circuitry 703 comprises a microprocessor and other circuitry that retrieves and executes software 705 from storage system 704. Storage system 704 comprises a non-transitory storage medium, such as a disk drive, flash drive, data storage circuitry, or some other memory apparatus. Software 705 comprises computer programs, firmware, or some other form of machine-readable processing instructions. Software 705 may further include an operating system, utilities, drivers, network interfaces, applications, or some other type of software. When executed by processing circuitry 703, software 705 directs processing system 702 to operate MME 700 as described herein.

In particular, when executed by processing circuitry 703, UE attach module 706 directs processing circuitry 704 to drive communication interface 701 to exchange first control data with the UE to establish an IMS signaling bearer and a media session bearer. When executed by processing circuitry 703, UE hand-over module 707 directs processing circuitry 703 to identify a UE hand-over between LTE access nodes during the IMS media session and determine an access technology difference between the LTE access nodes.

When executed by processing circuitry 703, IMS service modification module 708 directs processing circuitry 703 to determine when the service level for the IMS media session should be modified based on the access technology difference. When executed by processing circuitry 703, service modification module 708 directs processing circuitry 703 to drive communication interface 701 to exchange service modification data with the IMS. When executed by processing circuitry 703, UE service modification module 709 also directs processing circuitry 704 to drive communication interface 701 to exchange second control data with the UE to indicate a modification to the service level for the IMS media session.

Referring back to FIG. 1, UE 101 includes a user interface, memory device, software, processing circuitry, Radio Frequency (RF) communication circuitry, or some other communication components. UE 101 may be a telephone, computer, e-book, mobile Internet appliance, wireless network interface card, media player, game console, or some other wireless communication apparatus—including combinations thereof. UE 101 is a dual mode device capable of communicating over multiple wireless protocols, including LTE wireless networks and non-LTE wireless networks.

LTE access nodes 110-111 may be eNodeBs, femtocells, picocells, repeaters, mini-macrocells, or some other type of wireless access points. LTE access nodes 110-111 comprise computers, bus interfaces, and communication ports that comprise processing circuitry and memory devices to store and execute various software modules. LTE access nodes 110-111 may also include other components such as a router, server, data storage system, and power supply.

MME 120 includes a computer, bus interface, and communication ports that have processing circuitry and memory to store and execute various software modules. MME 120 may also include other components such as a router, server, data storage system, and power supply. MME 120 may reside in a single device or may be distributed across multiple devices.

Wireless links 150-151 may use air, space, or some other wireless material that transports media. Wireless links 150-151 may use protocols, such as LTE, CDMA, EVDO, IP, or some other wireless communication formats—including combinations thereof. Communication links 152-155 may use metal, glass, optics, air, space, or some other material as the transport media. Communication links 152-155 may use Time Division Multiplexing (TDM), IP, Ethernet, Synchronous Optical Networking (SONET), communication signaling, wireless communications, or some other communication format—including improvements thereof. Communication links 152-155 may be a direct link, or can include intermediate networks, systems, or devices, and can include a logical network link transported over multiple physical links.

The above descriptions and associated figures depict specific embodiments to teach those skilled in the art how to make and use the best mode of the invention. The following claims specify the scope of the invention. Note that some aspects of the best mode may not fall within the scope of the invention as specified by the claims. Those skilled in the art will appreciate variations from these embodiments that fall within the scope of the invention and that the features described above can be combined in various ways to form multiple embodiments. As a result, the invention is not limited to the specific embodiments described above, but only by the claims and their equivalents.

What is claimed is:

1. A method of operating a data communication system to deliver voice-conferencing and video-conferencing to User Equipment (UE), the method comprising:
   a wireless communication network establishing a SIP connection between the UE and an Internet Protocol Multimedia Subsystem (IMS);
   the IMS initiating a video-conference bearer for the UE over the wireless communication network;
   the wireless communication network exchanging video data over the video-conference bearer;
   in response to a UE handover from a source access node to a target wireless access node, the wireless communication network determining an access technology capability difference between the source access node and the target wireless access node and responsively signaling the IMS to convert the video-conference bearer into a voice-conference bearer at the target wireless access node;
   the IMS transferring a SIP message to the UE indicating the conversion and initiating the voice-conference bearer for the UE over the wireless communication network;
   the wireless communication network exchanging voice data over the voice-conference bearer;
   in response to another UE handover from the source access node to another target wireless access node, the wireless communication network determining an access technology capability difference between the source access node and the other target wireless access node and responsively signaling the IMS to convert the voice-conference bearer into another video-conference bearer at the other target wireless access node;
   the IMS transferring a SIP message to the other UE indicating the conversion and initiating the other video-conference bearer for the other UE over the wireless communication network; and
   the wireless communication network exchanging other video data over the other video-conference bearer.

2. The method of claim 1 wherein the wireless communication network signaling the IMS comprises a Mobility Management Entity (MME) determining a Carrier Aggregation (CA) technology at the target wireless access node.

3. The method of claim 1 wherein the wireless communication network signaling the IMS comprises a Mobility Management Entity (MME) signaling a Home Subscriber System (HSS) to determine the Carrier Aggregation (CA) technology at the target wireless access node.

4. The method of claim 1 wherein the wireless communication network signaling the IMS comprises a Mobility Management Entity (MME) signaling the IMS over a Policy Charging Rules Function (PCRF).

5. The method of claim 1 wherein the wireless communication network signaling the IMS comprises a Mobility Management Entity (MME) signaling the IMS over a Diameter Application Protocol.

6. The method of claim 1 wherein the IMS initiating the video-conference bearer and initiating the voice-conference bearer for the UE over the wireless communication network comprises a Call State Control Function (CSCF) initiating the video-conference bearer and the voice-conference bearer.

7. The method of claim 1 wherein the IMS initiating the video-conference bearer and initiating the voice-conference bearer for the UE over the wireless communication network comprises a Telephony Application Service (TAS) configured to initiate the video-conference bearer and the voice-conference bearer.

8. The method of claim 1 wherein the target wireless access point comprises a pico-cell access point or a femtocell access point that does not support CA.

9. The method of claim 1 wherein the video-conference bearer comprises a Quality-of-Service Class Indicator (QCI) 2.

10. The method of claim 1 wherein:
    the access technology capability difference between the source access node and the target wireless access node comprises a Carrier Aggregation (CA) capability difference; and
    the access technology capability difference between the source access node and the other target wireless access node comprises a CA capability difference.

11. A data communication system to deliver voice-conferencing and video-conferencing to User Equipment (UE), the data communication system comprising:

a wireless communication network configured to establish a SIP connection between the UE and an Internet Protocol Multimedia Subsystem (IMS);

the IMS configured to initiate a video-conference bearer for the UE over the wireless communication network;

the wireless communication network configured to exchange video data over the video-conference bearer;

in response to a UE handover from a source access node to a target wireless access node, the wireless communication network configured to determine an access technology capability difference between the source access node and the target wireless access node and responsively signal the IMS to convert the video-conference bearer into a voice-conference bearer at the target wireless access node;

the IMS configured to transfer a SIP message to the UE indicating the conversion and initiate the voice-conference bearer for the UE over the wireless communication network;

the wireless communication network configured to exchange voice data over the voice-conference bearer;

in response to another UE handover from the source access node to another target wireless access node, the wireless communication network configured to determine an access technology capability difference between the source access node and the target wireless access node and responsively signal the IMS to convert the voice-conference bearer into another video-conference bearer at the other target wireless access node;

the IMS configured to transfer a SIP message to the other UE indicating the conversion and initiate the other video-conference bearer for the other UE over the wireless communication network; and the wireless communication network configured to exchange other video data over the other video-conference bearer using CA.

12. The data communication system of claim 11 wherein the wireless communication network comprises a Mobility Management Entity (MME) configured to determine a Carrier Aggregation (CA) technology at the target wireless access node.

13. The data communication system of claim 11 wherein the wireless communication network comprises a Mobility Management Entity (MME) configured to signal a Home Subscriber System (HSS) to determine the Carrier Aggregation (CA) technology at the target wireless access node.

14. The data communication system of claim 11 wherein the wireless communication network comprises a Mobility Management Entity (MME) configured to signal the IMS over a Policy Charging Rules Function (PCRF).

15. The data communication system of claim 11 wherein the wireless communication network comprises a Mobility Management Entity (MME) configured to signal the IMS over a Diameter Application Protocol.

16. The data communication system of claim 11 wherein the IMS comprises a Call State Control Function (CSCF) configured to initiate the video-conference bearer and the voice-conference bearer.

17. The data communication system of claim 11 wherein the IMS comprises a Telephony Application Service (TAS) configured to initiate the video-conference bearer and the voice-conference bearer.

18. The data communication system of claim 11 wherein the target wireless access point comprises a pico-cell access point or a femto-cell access point that does not support CA.

19. The data communication system of claim 11 wherein the video-conference bearer comprises a Quality-of-Service Class Indicator (QCI) 2.

20. The data communication system of claim 11 wherein:

the access technology capability difference between the source access node and the target wireless access node comprises a Carrier Aggregation (CA) capability difference; and the access technology capability difference between the source access node and the other target wireless access node comprises a CA capability difference.

* * * * *